(12) United States Patent
Klafke

(10) Patent No.: US 9,604,593 B2
(45) Date of Patent: Mar. 28, 2017

(54) SAFETY BELT DEVICE

(75) Inventor: Ulrich Klafke, Kirchlinteln (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 86 days.

(21) Appl. No.: 13/819,241

(22) PCT Filed: Aug. 26, 2011

(86) PCT No.: PCT/US2011/049421
§ 371 (c)(1), (2), (4) Date: Feb. 26, 2013

(87) PCT Pub. No.: WO2012/027709
PCT Pub. Date: Mar. 1, 2012

(65) Prior Publication Data
US 2013/0154336 A1     Jun. 20, 2013

(30) Foreign Application Priority Data
Aug. 27, 2010 (DE) .................. 10 2010 036 092

(51) Int. Cl.
*B60R 22/34* (2006.01)
*B60R 22/28* (2006.01)

(52) U.S. Cl.
CPC .......... *B60R 22/34* (2013.01); *B60R 22/3413* (2013.01); *B60R 2022/287* (2013.01)

(58) Field of Classification Search
CPC .......... B60R 22/3413; B60R 2022/287; B60R 2022/3427
USPC .............................................. 242/379.1, 376
See application file for complete search history.

(56) References Cited

U.S. PATENT DOCUMENTS

| 4,119,281 | A | * | 10/1978 | Paitula et al. | ............... | 242/376 |
| 4,254,921 | A | * | 3/1981 | Adomeit | ................. | 242/376 |
| 4,256,273 | A | * | 3/1981 | Burleigh | ................. | 242/376 |
| 5,452,863 | A | * | 9/1995 | Hardy, Sr. | .................. | 242/376 |
| 5,529,259 | A | * | 6/1996 | Woydick et al. | ............. | 242/376 |

(Continued)

FOREIGN PATENT DOCUMENTS

| DE | 20000870 U1 | 5/2000 |
| DE | 20113834 U1 | 2/2002 |

(Continued)

OTHER PUBLICATIONS

International Search Report and Written Opinion corresponding to PCT/US2011/049421, dated Dec. 19, 2011.

*Primary Examiner* — Emmanuel M Marcelo
*Assistant Examiner* — Justin Stefanon
(74) *Attorney, Agent, or Firm* — Hauptman Ham, LLP

(57) ABSTRACT

Safety belt device, in particular for a motor vehicle, comprising a roll-up spindle rotatably supported in a frame, on which roll-up spindle a safety belt is held with its one end, wherein the roll-up spindle is biased into a roll-up position, in which the safety belt is rolled up on the roll-up spindle and the safety belt can be rolled off the roll-up spindle against the bias by rotating the roll-up spindle and wherein a torsion rod is provided in the roll-up spindle which is fastened to the roll-up spindle with a first end and which is fastened to the frame with a second end, wherein a plastic material is molded around the torsion rod in the roll-up spindle, wherein at least the second end of the torsion rod is free from the plastic material.

19 Claims, 3 Drawing Sheets

(56) References Cited

U.S. PATENT DOCUMENTS

Figure 1:
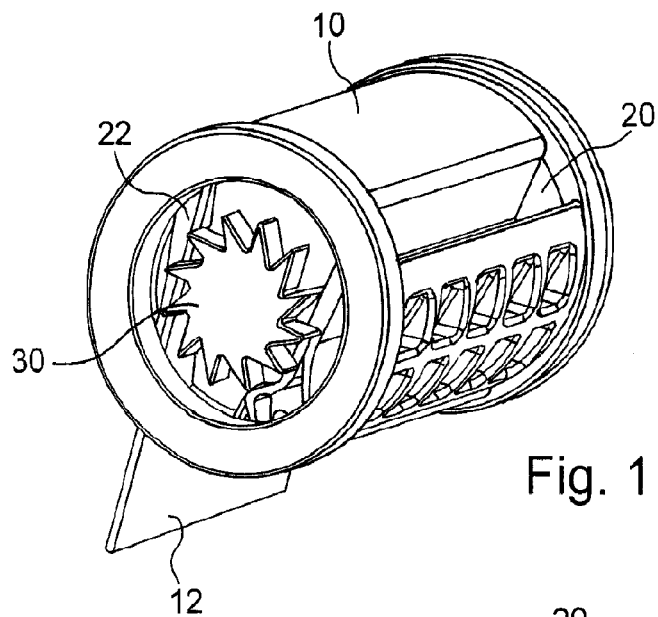

| | | | |
|---|---|---|---|
| 5,630,561 A * | 5/1997 | Ogawa et al. | 242/376 |
| 5,779,176 A * | 7/1998 | Hori et al. | 242/379.1 |
| 5,820,058 A * | 10/1998 | Hirzel et al. | 242/379.1 |
| 5,967,441 A | 10/1999 | Kohindorfer et al. | |
| 5,984,223 A * | 11/1999 | Hiramatsu | 242/379.1 |
| 6,105,894 A | 8/2000 | Singer et al. | |
| 6,237,869 B1 * | 5/2001 | Ahn | B60R 22/3413 |
| | | | 242/379.1 |
| 6,241,172 B1 | 6/2001 | Fugel et al. | |
| 6,267,314 B1 * | 7/2001 | Singer et al. | 242/379.1 |
| 6,336,606 B1 * | 1/2002 | Smithson et al. | 242/376 |
| 6,405,962 B1 * | 6/2002 | Hirase | 242/379.1 |
| 6,609,672 B2 * | 8/2003 | Bell et al. | 242/376 |
| 6,702,219 B2 * | 3/2004 | Tanji | B60R 22/343 |
| | | | 242/390.8 |
| 6,732,966 B2 * | 5/2004 | Wier | 242/376 |
| 6,745,970 B2 | 6/2004 | Wier | |
| 6,910,653 B2 * | 6/2005 | Tanji | B60R 22/44 |
| | | | 242/374 |
| 7,669,794 B2 * | 3/2010 | Boelstler et al. | 242/379.1 |
| 7,744,029 B2 * | 6/2010 | Gentner | B60R 22/3413 |
| | | | 242/379.1 |
| 2002/0070307 A1 | 6/2002 | Hiramatsu et al. | |
| 2003/0038202 A1 | 2/2003 | Wier | |
| 2007/0075173 A1 | 4/2007 | Boelstler et al. | |

FOREIGN PATENT DOCUMENTS

| | | |
|---|---|---|
| EP | 1213195 A2 | 6/2002 |
| JP | 2004074882 A | 3/2004 |
| WO | 9632303 A1 | 10/1996 |
| WO | 9749583 A1 | 12/1997 |
| WO | 9905057 A1 | 2/1999 |

\* cited by examiner

SAFETY BELT DEVICE

RELATED APPLICATIONS

The present application is a National Phase of International Application Number PCT/US2011/049421, filed Aug. 26, 2011, and claims priority from German Application Number 102010036092.9, filed Aug. 27, 2010.

The invention relates to a safety belt device, in particular for a motor vehicle, comprising a roll-up spindle rotatably supported in a frame, on which roll-up spindle a safety belt is held with its one end, wherein the roll-up spindle is biased into a roll-up position, in which the safety belt is rolled up on the roll-up spindle and the safety belt can be rolled off the roll-up spindle against the bias by rotating the roll-up spindle and wherein a torsion rod is provided in the roll-up spindle which is fastened to the roll-up spindle with a first end and which is fastened to the frame with a second end.

Safety belt devices of this kind are used in automobiles, for example. The safety belt is held on the roll-up spindle and is biased by the latter into a roll-up position. Safety belt devices of this kind are generally also equipped with a locking and a belt tensioner system. The belt tensioner system tensions the safety belt into the rolled-up position in the case of an accident. If there is severe loading on the belt during such an accident, owing to a forward movement of a vehicle passenger for example, the safety belt is prevented from unrolling from the roll-up spindle by the locking system. An uncontrolled forward movement of the passenger is thereby prevented. During this process, very high forces act on the safety belt device, especially on the roll-up spindle.

One known practice is therefore to provide a torsion rod in a hollow space of the roll-up spindle, said torsion rod being fastened by one end thereof to the roll-up spindle and by the other end thereof to the frame of the safety belt device. The frame is generally connected to the vehicle body. As the forces acting on the roll-up spindle take effect in the case of a crash, the torsion rod is twisted. As a result, energy is dissipated and the torsion rod brings about damping.

Torsion rods generally have significant cross-sectional extensions at the two ends thereof in order reliably to transmit the torques that occur in the case of a crash. In order to insert the torsion rod with its cross-sectional extensions into the hollow space of the roll-up spindle, which is usually a hollow cylinder, the hollow space must be of sufficient size. This and the maximum outside dimensions of the roll-up spindle give rise to the spindle volume available for the transmission of forces. Known roll-up spindles generally consist of metal in order to withstand the enormous forces in the case of a crash with this volume. Although a plastic material would be desirable for reasons of cost, weight and manufacture, the same robustness is not achieved with plastic spindles, given the limited volume.

Starting from the prior art explained, it is the underlying object of the invention to provide a safety belt device of the type stated at the outset which is of lower-cost and lower-weight construction than the prior art yet reliably meets the safety requirements in all cases.

According to the invention, this object is achieved by the subject matter of claim 1. Advantageous embodiments can be found in the dependent claims, the description and the figures.

For a safety belt device of the type stated at the outset, the invention achieves the object by the fact that a plastic material is molded around the torsion rod in the roll-up spindle, wherein at least the second end of the torsion rod is free from the plastic material. The second end of the torsion rod is in engagement with the frame or the housing of the safety belt device. This frame or housing is generally connected to the vehicle body. The safety belt device according to the invention can be provided for an automobile and can comprise a belt tensioner system in a manner known per se. It is furthermore possible, likewise in a manner known per se, for a locking device to be provided, said device having a latching system which locks the safety belt at high accelerations, e.g. in the case where the automobile strikes an obstacle or when the automobile is at a large angle, thus ensuring that a passenger is restrained by the belt. The roll-up spindle can be designed as a hollow cylinder in a manner which is likewise known per se.

The torsion rod can have cross-sectional extensions at the ends thereof in a manner known per se. These are in engagement with the frame or the roll-up spindle. The cross-sectional extensions can be provided with at least one projection, preferably several projections, in a radial direction. The projections serve as driving features for torque transmission in the case where high forces are imposed on the safety belt device, e.g. when an automobile strikes an obstacle. The inventive molding in or casting in of the torsion rod takes place in a plastic injection molding procedure. In this case, the torsion rod is enclosed substantially completely by molded plastic material, except for the second end thereof. In particular, the first end of the torsion rod can be fully molded in. Thus, the torsion rod is surrounded securely by the plastic material. The roll-up spindle can have a hollow space which is larger than the torsion rod before the molding in of the torsion rod, thus enabling the torsion rod to be inserted without problems into the hollow space, even when the cross-sectional extensions are large. By means of the subsequent molding in, in particular, of the first end of the torsion rod, the projections of the cross-sectional extension are incorporated into the roll-up spindle in an optimum manner. At the same time, the effective volume for force transmission is increased without an unwanted increase in the outside dimensions of the spindle. As a result, high retention forces are achieved and, in the case of a crash, reliable transmission of the torques acting during this process is ensured. The roll-up spindle achieves a higher strength, especially at high temperatures. At the same time, the roll-up spindle according to the invention has a compact form factor.

The torsion rod can consist of a metal material in a manner known per se. However, it is possible according to the invention for the roll-up spindle to consist substantially completely of a plastic material. Such a plastic material reduces the production costs and the weight of the device. At the same time, it is possible in all cases to withstand the loading which occurs in the case of a crash, just as with conventional metal roll-up spindles.

As already mentioned, the plastic material can be injected into a hollow space of the roll-up spindle. Thus, the roll-up spindle can be produced in advance and, in this case, can furthermore consist of a different material than the injection-molding plastic. However, it is also possible for the roll-up spindle to be molded fully around the torsion rod in a plastic injection molding procedure, this being a particularly simple approach in terms of production engineering.

According to a particularly practical embodiment, the torsion rod can have in each case a star-shaped cross-sectional extension on its first and second end. The star-shaped cross-sectional extensions ensure particularly reliable torque transmission. According to another embodiment, the roll-up spindle can comprise several ribs extending in a radial direction starting from the molded-in torsion rod. These ribs can be produced during the molding in of the torsion rod. They provide the roll-up spindle with a high bending stiffness.

According to another embodiment, provision can be made for the safety belt, starting from its end held on the roll-up spindle to exit the roll-up spindle through an exit opening, and for the safety belt, in its state fully rolled off the roll-up spindle, to run surface to surface over at least one surface between its end held on the roll-up spindle and the exit opening of the roll-up spindle. In this embodiment, the safety belt is thus guided surface to surface over at least one surface. This means that the safety belt rests surface to surface on this surface, i.e. in surface to surface frictional contact with the surface. The friction surface thus formed is provided between the anchoring of the end of the belt and the exit opening of the roll-up spindle and forms a winding surface for the belt. The friction surface absorbs some of the force acting on the safety belt device during the imposition of a load. This in turn reduces the forces acting on the roll-up spindle in the particularly critical region of the anchoring of the end of the belt. This in turn further reduces the stability requirements on the roll-up spindle, thus further improving safety when using plastic roll-up spindles.

The at least one surface can be a surface of the roll-up spindle, in particular the outer surface of the roll-up spindle. The surface can furthermore be formed by a jacketing layer applied to an outer surface of the roll-up spindle. Moreover, the at least one surface can be curved. These embodiments are distinguished by low outlay in terms of construction since only slight modifications are needed to the construction of the roll-up spindle as compared with known spindles. If a jacketing layer is provided, this can consist of a plastic material which has a particularly high coefficient of friction, for example. The friction surface can be adapted in an optimum manner to the path of the belt through curvature of the surface, e.g. circular curvature, thus giving rise to particularly large-area and uniform frictional contact.

According to another embodiment, in the roll-up spindle there can be at least one slit with an entrance opening and the exit opening, wherein the safety belt runs through the slit. The belt thus runs through the entrance opening into the slit, through the latter and back out of it through the exit opening. The slit can be of substantially planar design or have a curvature. According to another embodiment pertaining thereto, the at least one surface can be a surface laterally delimiting the at least one slit.

According to another embodiment, provision can be made for the safety belt, in the state fully rolled off the roll-up spindle and starting from its end held on the roll-up spindle to run initially through a first slit in the roll-up spindle and subsequently to run over the at least one surface and further subsequently to run through a second slit in the roll-up spindle. The belt then runs out of the spindle through the exit opening, which is formed, in particular, by the second slit. The safety belt thus emerges from the first slit, runs on via the outer surface of the roll-up spindle, said surface being curved for example, and then enters the second slit. Both as it emerges from the first slit and as it enters the second slit, the belt can be deflected, e.g. by more than 60°, in particular by about 90°. The first and second slits can run parallel to one another. Particularly uniform loading of the roll-up spindle is thereby achieved.

According to another embodiment, the safety belt in the state fully rolled off the roll-up spindle and starting from its end being held on the roll-up spindle can run initially over the at least one surface and subsequently through at least one slit in the roll-up spindle. The belt then runs out of the roll-up spindle through the exit opening, which can once again be formed by the slit. In this embodiment, this slit can be the only slit in the roll-up spindle. Starting from its anchoring, the belt thus runs initially over the friction surface and then through the slit.

According to another embodiment, the safety belt can comprise a loop on its end held on the roll-up spindle, through which a bolt is guided, which is held in a receptacle of the roll-up spindle.

Figure 2:
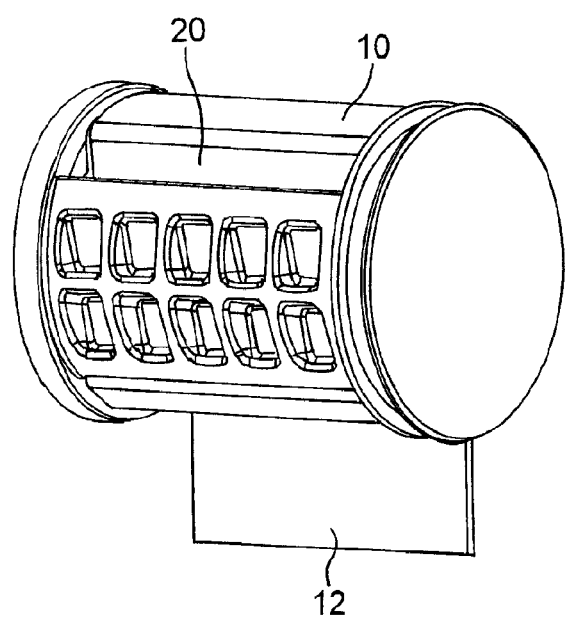
Figure 3:
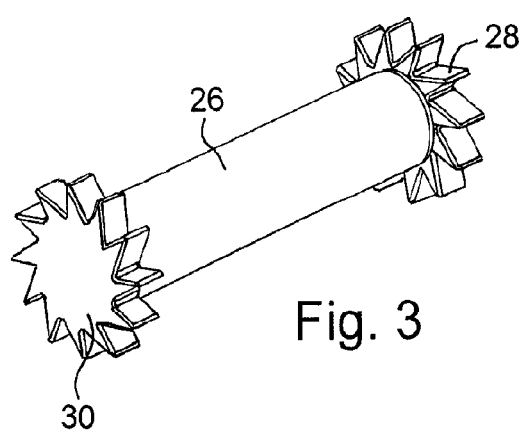
Figure 4:
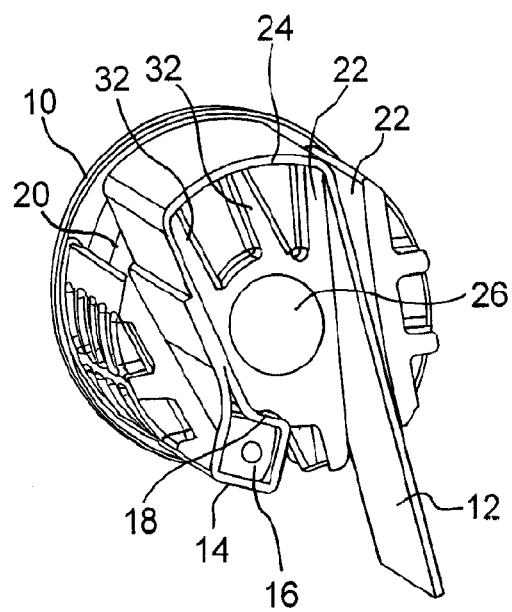
Figure 5:
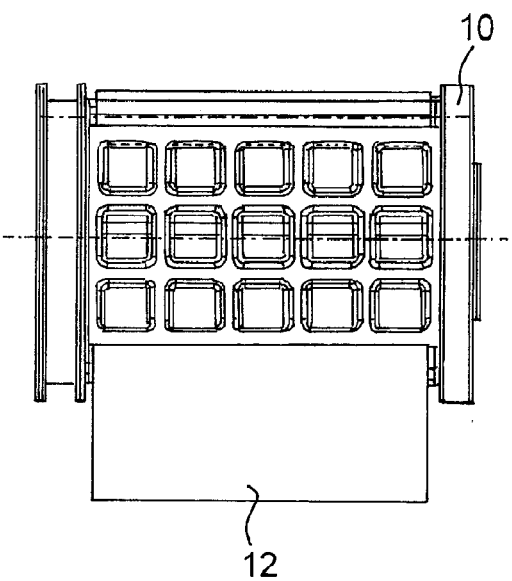
Figure 6:
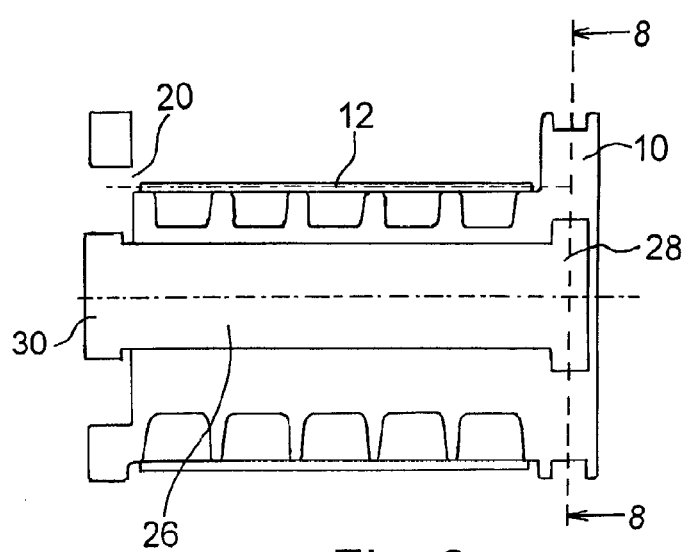
Figure 7:
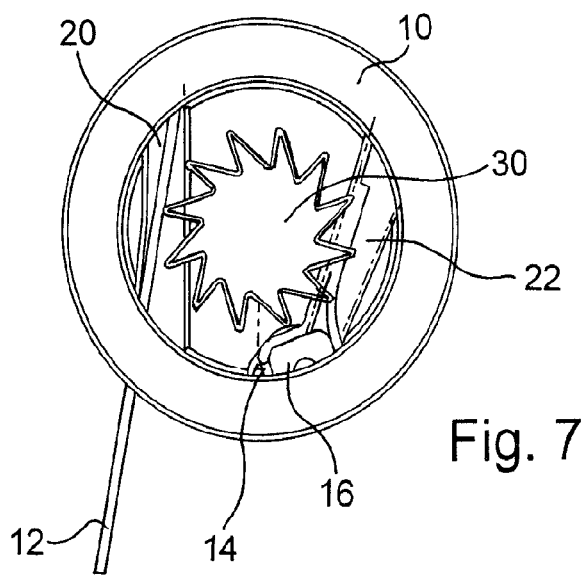
Figure 8:
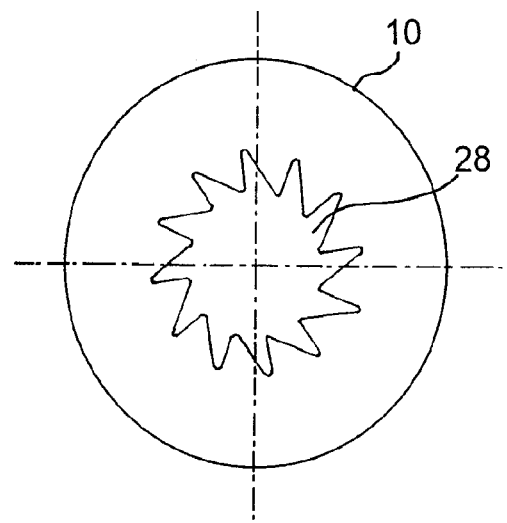

An illustrative embodiment of the invention will be explained in greater detail below with reference to schematic figures, of which:

FIG. 1 shows a safety belt device according to the invention in a first perspective view, FIG. 2 shows the safety belt device from FIG. 1 in a second perspective view, FIG. 3 shows a torsion rod of a safety belt device according to the invention in a perspective view, FIG. 4 shows the safety belt device from FIG. 1 in a perspective cross-sectional view, FIG. 5 shows the safety belt device from FIG. 1 in a side view, FIG. 6 shows the safety belt device from FIG. 1 in a longitudinally sectioned view, FIG. 7 shows the safety belt device from FIG. 1 in an end view, and FIG. 8 shows the safety belt device from FIG. 1 in a cross-sectional view along the line 8-8 in FIG. 6.

Unless indicated otherwise, the same reference signs are used to denote the same objects in the figures. The safety belt device according to the invention is provided for an automobile and comprises a roll-up spindle 10 rotatably supported in a frame or housing (not shown specifically). In the example shown, the roll-up spindle 10 has the basic shape of a hollow cylinder. A safety belt 12 is held by one end thereof on the roll-up spindle 10. It can be seen, particularly in the perspective cross-sectional view in FIG. 4, that the safety belt 12 comprises a loop 14 on its end held on the roll-up spindle 10, through which a bolt 16 is guided, which is held in a corresponding receptacle 18 of the roll-up spindle 10. The safety belt device furthermore comprises a locking device known per se, said device having a latching system which locks the safety belt 12 at high accelerations, e.g. in the case where the automobile strikes an obstacle or when the automobile is at a large angle, thus ensuring that a passenger is restrained by the belt. The roll-up spindle is biased into a roll-up position, in which the safety belt 12 is rolled up on the roll-up spindle 10. The belt 12 can be rolled off the roll-up spindle against this bias by rotating the roll-up spindle 10.

As can be seen particularly in FIGS. 4 and 6, the safety belt 12 is guided through two substantially planar slits 20, 22 running parallel to one another through the roll-up spindle 10. At the lower end of the slit 20 in FIG. 4, said slit has a narrowed portion, thus preventing the bolt 16 from being pulled upward through the slit. The safety belt 12 is thereby anchored in the opening of the slit 20 against an upward movement in FIG. 4.

As can likewise be seen in FIG. 4, for example, the safety belt 12, starting from its anchoring on the bolt 16, runs through the first slit 20 and through an upper exit opening of the slit 20 and is then deflected by about 90°. After this, the safety belt 12 runs over an upper curved outer surface 24 of the roll-up spindle 10. In the process, the safety belt 12 is guided over about ⅛ of the circumference of the roll-up spindle 10. The safety belt 12 is then guided through an upper entrance opening of the slit 22 and into the latter and is guided through said slit to a lower exit opening and out of the latter, as can be seen particularly in FIG. 4. For entry to the second slit 22, the safety belt 12 is once again deflected by about 90°. In the fully rolled-off state of the safety belt 12, which is illustrated in the figures, said belt rests surface to surface on the outer surface 24 of the roll-up spindle 10. In the case where a high force is imposed, some of the force is absorbed by the friction surface 24, with the result that the force acting on the roll-up spindle 10 and especially on the anchoring on the bolt 16 is correspondingly reduced.

Moreover, a torsion rod 26 is arranged within the roll-up spindle 10, said rod being shown in FIG. 3 for example. Whereas the torsion rod 26 consists of a metal material, the roll-up spindle 10 in the example shown consists of a plastic material. At each of its two ends, the torsion rod 26 has a star-shaped cross-sectional extension 28, 30. For assembly, the torsion rod 26 has been inserted into a hollow space of the roll-up spindle 10, with said hollow space no longer being visible in the figures. The hollow space has then been filled with a plastic material in a plastic injection molding procedure. During this process, the torsion rod 26 has been fully cast into the roll-up spindle 10, except for its second end and its cross-sectional extension 30. As can be seen in FIG. 4, several ribs 32 formed in a radial direction have been formed in the course of the plastic injection molding procedure. FIG. 8 shows a cross-sectional view along the line 8-8 in FIG. 6. It can be seen from FIGS. 6 and 8 that the first end of the torsion rod 26 with the cross-sectional extension 28 has been fully cast into the roll-up spindle 10. This results in optimum force transmission between the spindle 10 and the torsion rod 26.

The safety belt device according to the invention meets the safety requirements in a reliable manner in all cases when the roll-up spindle 10 is produced from a plastic material.

The invention claimed is:

1. Safety belt device, in particular for a motor vehicle, comprising a roll-up spindle rotatably supported in a frame to rotate with respect to the frame, on which roll-up spindle a safety belt is held with its one end, wherein the roll-up spindle is biased into a roll-up position, in which the safety belt is rolled up on the roll-up spindle and the safety belt can be rolled off the roll-up spindle against the bias by rotating the roll-up spindle and wherein a torsion rod is provided in the roll-up spindle which is fastened to the roll-up spindle with a first end and which is fastened to the frame with a second end, wherein a plastic material is molded around the torsion rod in the roll-up spindle, the plastic material covering a first end of the torsion rod with the plastic, wherein an opposite end of the torsion rod is free of the plastic, wherein at least the second end of the torsion rod is free from the plastic material,
wherein the torsion rod comprises an extension on its first end, the extension having a diameter greater than a diameter of a mid-portion of the torsion rod, and wherein the roll-up spindle completely envelops and is in contact with the extension on the first end such that enveloping portions of the roll-up spindle extend from a first surface on a first side of the extension and in direct contact with the first surface to a second surface on a second side of the extension opposite the first side and in direct contact with the second surface, wherein the first and second surfaces are normal to a longitudinal direction of extension of the torsion rod, and wherein the roll-up spindle is a monolithic component.

2. Safety belt device according to claim 1, wherein the roll-up spindle consists of a plastic material.

3. Safety belt device according to claim 1, wherein the plastic material is injected into a hollow space of the roll-up spindle.

4. Safety belt device according to claim 1, wherein the roll-up spindle is fully molded around the torsion rod in a plastic injection molding procedure.

5. Safety belt device according to claim 1, wherein the roll-up spindle comprises several ribs extending in a radial direction starting from the cast-in torsion rod.

6. Safety belt device according to claim 1, wherein the safety belt, starting from its end held on the roll-up spindle, exits the roll-up spindle through an exit opening, and in that the safety belt, in its state fully rolled off the roll-up spindle, runs surface to surface over at least one surface between its end held on the roll-up spindle and the exit opening of the roll-up spindle.

7. Safety belt device according to claim 6, wherein the safety belt, in the state fully rolled off the roll-up spindle and starting from its end held on the roll-up spindle, runs initially through a first slit in the roll-up spindle and subsequently runs over the at least one surface and further subsequently runs through a second slit in the roll-up spindle.

8. Safety belt device according to claim 6, wherein the safety belt in the state fully rolled off the roll-up spindle and starting from its end being held on the roll-up spindle runs initially over the at least one surface and subsequently through at least one slit in the roll-up spindle.

9. Safety belt device according to claim 8, wherein the safety belt comprises a loop on its end held on the roll-up spindle, through which a bolt is guided, which is held in a receptacle of the roll-up spindle.

10. A motor vehicle safety belt apparatus, comprising:
a roll-up spindle rotatably supported in a frame;
a torsion rod; and
a safety belt, wherein
a safety belt is held on the roll-up spindle by an end thereof,
the roll-up spindle is biased into a roll-up position, in which the safety belt is rolled up on the roll-up spindle,
the safety belt apparatus is configured such that the safety belt can be rolled off the roll-up spindle against the bias by rotating the roll-up spindle,
wherein the torsion rod is located in the roll-up spindle and is fastened to the roll-up spindle with a first end and is fastened to the frame with a second end,
a plastic material is molded around the torsion rod in the roll-up spindle, and
at least the second end of the torsion rod is free from the plastic material,
wherein the torsion rod comprises an extension on its first end, the extension having a diameter greater than a diameter of a mid-portion of the torsion rod, and wherein the roll-up spindle completely envelops and is in contact with the extension on the first end such that enveloping portions of the roll-up spindle extend from a first surface on a first side of the extension and in direct contact with the first surface to a second surface on a second side of the extension opposite the first side and in direct contact with the second surface, wherein the first and second surfaces are normal to a longitudinal direction of extension of the torsion rod, and wherein the roll-up spindle is a monolithic component.

11. The apparatus of claim 10, wherein:
the first end of the torsion bar is fully injection molded into the roll-up spindle.

12. The apparatus of claim 10, wherein:

the roll-up spindle includes a hollow space;

the apparatus further comprises a filler portion made of plastic, wherein the filler portion, along with the torsion rod, fills at least a portion of the hollow space.

13. The apparatus of claim 10, wherein:

the roll-up spindle includes a hollow space;

the apparatus further comprises a filler portion made of plastic, wherein the filler portion, along with the torsion rod, fills at least a portion of the hollow space; and the filler portion separates the torsion rod from the roll-up spindle while fixing the torsion rod to the roll-up spindle.

14. The apparatus of claim 10, wherein the plastic material is located in hollow space of the roll-up spindle.

15. The apparatus of claim 10, wherein the torsion rod comprises a star-shaped cross-sectional extension on its first and second end.

16. The apparatus of claim 10, wherein:

the roll-up spindle is rotatably supported in the frame to rotate with respect to the frame; and the plastic material covering a first end of the torsion rod with the plastic, wherein an opposite end of the torsion rod is free of the plastic.

17. The apparatus of claim 10, wherein the roll-up spindle completely envelopes the first end of the torsion rod.

18. The apparatus of claim 10, wherein at least a portion of the roll-up spindle is injection molded about the torsion rod such that the first end of the torsion rod is positively retained in the roll-up spindle.

19. The apparatus of claim 10, wherein a majority of the torsion rod is full cast into the roll-up spindle.

* * * * *